United States Patent [19]
Goldstein

[11] Patent Number: 5,162,823
[45] Date of Patent: Nov. 10, 1992

[54] EYEGLASS TEMPLES HAVING ADJUSTABLE "D" SHAPED EAR PIECE ELEMENTS

[76] Inventor: Ronald S. Goldstein, 58 West 87th St., New York, N.Y. 10024

[21] Appl. No.: 574,339

[22] Filed: Aug. 29, 1990

[51] Int. Cl.⁵ .............................................. G02C 5/14
[52] U.S. Cl. ..................................... 351/123; 351/111
[58] Field of Search ............... 351/123, 156, 157, 111, 351/121, 153, 118; 2/448; 24/3 C

[56] References Cited

U.S. PATENT DOCUMENTS 186,002  9/1922  Barnes .................................. 351/118

FOREIGN PATENT DOCUMENTS 376978  6/1923  Fed. Rep. of Germany ...... 351/123

Primary Examiner—Rodney B. Bovernick

[57] ABSTRACT

This invention provides an eyeglass support system suitable for supporting corrective lenses for young children, for supporting sunglasses or corrective glasses for athletes dentists, physicans, surgeons, equipment operators or the handicapped which can hold the eyeglasses comfortably and securely without any strap or headband and which, when assembled with eyeglasses mounted in a frame, can be donned with one hand. The eyeglass support system of this invention includes a temple having a D-shaped ear-attachment means which fits comfortably around the ear. In preferred embodiments, the system includes several adjustments for accurate fit and unique temple designs that are less annoying, especially to small children. A unique feature of the system is the ability to support eyeglasses from one ear facilitating easy on-and-off use.

14 Claims, 2 Drawing Sheets

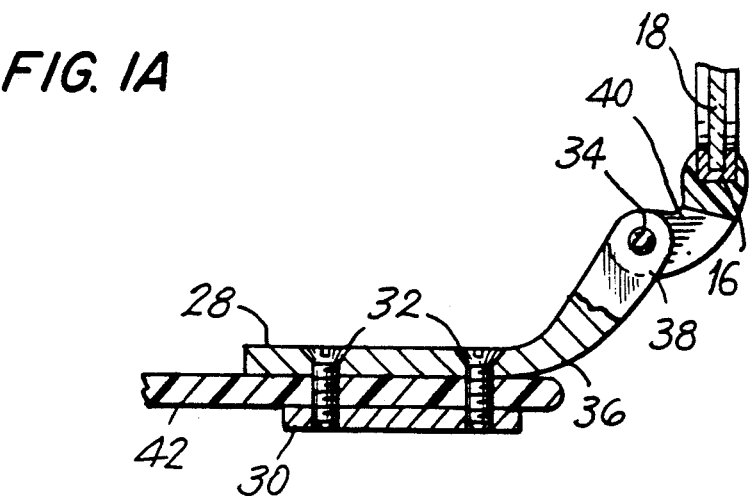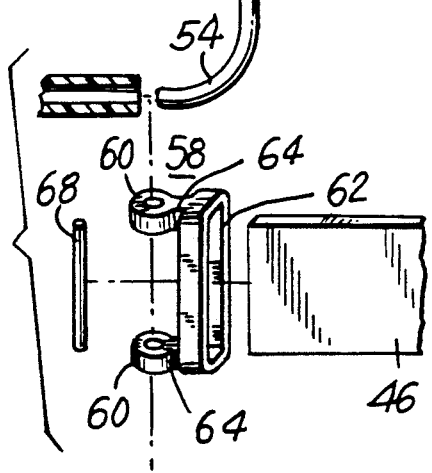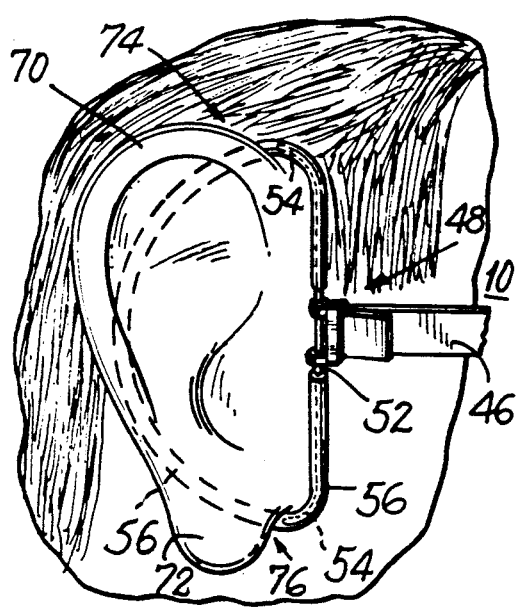

5,162,823

EYEGLASS TEMPLES HAVING ADJUSTABLE "D" SHAPED EAR PIECE ELEMENTS

BACKGROUND OF THE INVENTION

1. Field of the Invention

The present invention relates to improvements in eyeglasses and more particularly it relates to an improved eyeglass support system which can support a pair of eyeglasses in the customary position on the bridge of a wearer's nose in a novel manner which is useful and provides some unexpected advantages, as will be made apparent herein.

2. The Prior Art

Conventional eyeglasses comprise a frame having an eye wire extending around and holding a pair of lenses, one for each eye and having a bridge between the lenses to rest on the wearer's nose and support the lenses in front of their eyes, and further comprise a pair of temples extending from the frame at opposed sides thereof to lie across each ear thereby to hold the eyeglasses in position, for which purpose the temples are provided with downward extensions, or earpieces, at their extremities. Commonly this extension is a more or less straight finger angled to the temple which may or may not be provided with some curvature towards the back of the wearer's head, and this arrangement is quite satisfactory for many eyeglass wearers. The Yerur "eye wire" is used herein to include a bow or any other support structure for the buses.

Greater holding power is conventionally obtained by curving the temple extensions quite sharply and downwardly into a C-shape to fit snugly around the back of the ear. These curved temple extensions are often formed to lie substantially all the way around the auricle and to terminate in the vicinity of its lobule, or the ear lobe. With this design the temple extension is usually flexible and resilient to help the wearer put the eyeglasses on. This style is often prescribed for young children whose vigorous activity is likely to cause their eyeglasses to fall off.

Young children wearing corrective lenses have a special need for accurately positioning the lenses correctly and for holding them positioned. With their rapidly developing visual system already displaying optical abnormalities it is especially important that the condition not be aggravated by poor, inadequate or distortive corrective attributable to improper positioning of the lenses. Furthermore, young children tend to be impatient and to find conventional eyeglasses to be annoying. The prior art fails to offer an eyeglass support system which is adequately adjustable, can securely and comfortably position the eyeglasses and is adequately attractive to be satisfactory for children's corrective lenses.

Whilst the above-described temple extension designs have obviously been satisfactory for most wearers, witness the tens or hundreds of millions of eyeglasses that incorporate them, they can have serious shortcomings for children and infants because of their activity and possibly undeveloped dexterity, for disabled or elderly people having limited use of their hands, for athletes again because their activity is likely to dislodge the eyeglasses, for equipment operators who may have only one hand available for donning special purpose or protective eyeglasses for dentists, physicians and surgeons who wear specialized optical equipment when working, and for people suffering disease or malformation of the outer ear that creates problems with the support apparatus of conventional eyeglasses, for all these groups there has been a long-felt need for an improved eyeglass support system which is more secure and easier to don than the widespread temple extension system.

The need for such a support system having been so long felt, there have, of course, been various proposals for improvement. The most common, probably, is an elasticated headband which passes across the back of the head and which has its ends secured, usually removably, to the temple extensions, or else, with the temples and hinges displaced by the headband, secured directly to the opposed sides of the frame, generally without hinges. This latter construction is well known in the form of goggles, or where the eyeglass comprises a single lens extending across both eyes, a face mask.

This elasticated headband can certainly help secure the eyeglasses but it has important drawbacks in that the eyeglasses can be difficult to put on, requiring two hands; the elastication of necessity exerts pressure on the user's nose, face and head so that the eyeglasses are somewhat uncomfortable and not suited for all day wear; and the headband is unsightly, not lending itself to fashionable design. Such elasticated eyeglasses accordingly find utility for short-term specialized applications such as swimming and cycling, notably as goggles, and such as protection of operators of equipment, especially as face masks.

The problems of comfort and appearance are particularly important when fitting small children with corrective lenses.

There is accordingly still a long-standing need for an improved support system that can help overcome the aforesaid drawbacks.

BRIEF SUMMARY OF THE INVENTION

It is one object of the present invention to provide an improved eyeglass support system which can hold eyeglasses securely in place on a wearer whilst being comfortable to wear all day.

It is a further object to provide an eyeglass support system which is suitable for use by young children, athletes and disabled people.

Yet another object of the present invention is to provide such an eyeglass support system which is further adapted to be suitable for supporting corrective lenses on young children by offering adequate adjustability and selectability accurately to position the eyeglasses and comfortably to hold them in position for extended periods of wear.

It is a further object of this invention to provide such an eyeglass support system which lends itself to fashionable development in a diversity of colors and styles.

It is yet another object of the present invention to provide such an eyeglass support system which is easier to put on, and more specifically can be donned using only one hand and is thus especially useful to people who have lost the use of one hand, permanently, or perhaps temporarily by for example having their arm in a sling, or through injury or deformity.

Accordingly, the present invention provides an improved eyeglass support system for eyeglasses which include a frame having an eye wire extending around and holding a pair of lenses, one for each eye and having a bridge between the lenses to rest on the wearer's nose and support the lenses in front of their eyes which eyeglass support system comprises a pair of temples to extend from the frame at opposed sides thereof to lie across each ear, connecting means to connect each temple at one end thereof to one of the sides of the frame, and ear-attachment means for each temple which includes an elongated earpiece connected to its temple so as to be substantially upright when the wearer's head is also upright and a pair of upper and lower ear-embracing arms extending respectively over and around the upper ear in the cleft between the upper ear and the head and under and around the lower ear or ear lobe in the cleft between the lower ear and the head or upper neck said ear-attachment means being capable of holding each temple attached to its respective ear and thereby hold the eyeglasses in position.

Preferably, the temples are adjustable in length, which is of great help in maintaining proper fit for growing infants and children.

In a preferred embodiment, the elongated earpiece is substantially rigid and a pair of ear-embracing arms extend around the ear and are joined together behind it so that the ear-attachment means is generally D-shaped, and more particularly, is a D-shaped ring. In an alternative embodiment, each arm terminates in a comfortable cushion to grip behind the ear, and the ear-attachment means are each sufficiently rigid to engage the ear securely, although they are desirably also resilient.

A unique feature of this invention is that it provides for vertical adjustability for more accurately positioning the lenses on different anatomies; which is especially important for infants and young children with developing systems. Thus the point visual of attachment of each end of the temple can be varied by design as can the conformation of the temple.

By virtue of its novel and surprising structures, the invention provides an eyeglass support system which can hold a pair of eyeglasses quite securely even on an athletic child. Because the temple is held not only above, but below the ear it is unlikely, and perhaps impossible that they will fall off, even when the wearer's head is inverted. It is surprising that a simple construction, which not incidentally lends itself to fashionable and appealing embodiments and embellishments, can be devised that will attach to the lower ear because of the softness, tenderness and diverse nature of ear lobes, around which the lower ear-embracing arm passes.

Unlike the prior art constructions, eyeglasses equipped with the eyeglass support system of this invention are more or less unaffected by perspiration and yet do not have to be clamped tightly on sensitive parts of the wearer's anatomy. Plainly, the simple temple-extension design of the prior art will easily slip off a perspiring user, and whilst the conventional designs described above which include a C-shaped temple extension (or cable temple) or an elasticated headband, should hold the eyeglasses reasonably securely, of necessity they must clamp tightly against the wearer with the risk of sore spots, discomfort or abrasions. Thus reaction to an elasticated headband will exert pressure on the bridge of the nose as well as the back of the head or neck, whilst the C-shape temple extension design is notorious for causing discomfort behind the ear, where it usually fits resiliently and which is often a tender area. In particular the terminator of the C-shape extension tends to press uncomfortably into a tender region just behind the ear lobe. The present invention relies for its effects on no such pressure-point structures and can be designed to fit most comfortably and indeed can even fit somewhat loosely whilst still holding the eyeglasses effectively.

A valuable and surprising advantage of the invention is that an eyeglass assembly including the aforesaid eyeglass support system will hang quite satisfactorily from one ear. This is of value to wearers who have the use of only one hand, who may use that hand to fit the eyeglass assembly over one ear, let go of it, lift the frame into place on the nose and then fit the assembly around the other ear, a difficult feat to accomplish with conventional eyeglass support systems. This feature has merit not only for the disabled but also for the able bodied who have to keep one of their two hands busy, for example a car driver donning his sunglasses.

An important point about the especially meritorious D-shaped construction of the ear-attachment means which avoids any problems with uncomfortable or damaging, ends, terminators or pressure points is that it exploits the natural flexibility of the ear in providing a ring-shaped attachment device designed to fit more or less closely around the base of the ear and yet substantially smaller than the outer ear or auricle, recognizing that nearly all potential wearers can readily fold their ear to fit it through the ring shape, without discomfort. Furthermore, the ring-shaped ear attachment device can be made adjustable to accommodate ears of different sizes with a comfortable, user-determined fit. The prior art has not previously recognized this possibility, which represents one of a number of novel and surprising insights of the present invention.

With advantage, but this is not the only way of realizing the advantages of the invention, each temple comprises a single member connected to the elongated earpiece intermediately of said ear-embracing arms, and preferably, but not exclusively, substantially in the middle thereof. The temple-to-earpiece connection means can also be made adjustable, preferably by an ophthalmologist, optometrist, or optician, to vary the length of the temple, for which purpose the temple is laterally flexible. With this construction each temple can be shaped to extend generally downwardly from its connection point at a side of the frame carrying it somewhat out of sight of the wearer. This is of particular value where the connection point is substantially in the middle, in a vertical sense, of the side of the frame, in giving the eyeglasses a less intrusive effect on the user and creating an eyeglass assembly which is less unappealing to a nervous, perhaps first-time wearer, such, for example as a small child.

Alternatively, each temple could comprise an upper and lower member connected between a side of the eyeglass frame and the upper and lower ear-embracing arms respectively.

Each ear-attachment means is preferably adjustable, and to this end, in a particularly ingenious embodiment, the elongated earpiece comprises a substantially rigid rod having upper and lower ends and the ear attachment means includes a flexible tube which is a tight but slidable fit on the rod and can extend from one end of the rod around the back of the ear to the other end of the rod to provide a generally D-shaped ear-attachment means. In this embodiment the ear-embracing arms are provided either by the rod, or extensions thereof or by the flexible tube or by both together and in one arrangement the ends of the rigid-rod earpiece are each turned to fit around the ear and the flexible tube extends on to the rod past the turned ends to be held securely but slidably thereon.

The connecting means at the end of each temple can, with advantage, but this is not an essential arrangement, comprise an apertured hinge nub and screw or threaded hinge pin formed to connect with the standard hinge fork that is commonly provided on the sides of the frame of eyeglasses having hinged temples. Alternatively, the connecting means can comprise a releasable clip adapted to pass through the apertures in said frame hinge fork and lock on to them whereby the temples can readily be connected to and disconnected from a hinged eyeglass frame. This novel feature allows the user quickly to change between diverse eyeglasses having different optical or esthetic characteristics.

Various of the many advantages of the present invention are attributable to the fact that this invention provides a comfortable and secure eyeglass support system without the need for any head band across the back of the head or the neck. In other words the pair of ear attachment means is free and independent the one of the other and the wearer has a support system free of obstructions across the back of his head.

The invention extends to a combination of the aforesaid inventive eyeglass support system with a pair of eyeglasses. The eyeglass itself can have a variety of characteristics such as being refractive for vision correction or being tinted or treated for filtration. Whilst this specification discusses the merits of that construction of eyeglass support system in which the temples are removably or releasably connected to an eyeglass frame, this is not an essential feature of the invention, and the temples can well be permanently connected to the eyeglass frame for original equipment manufacture, within the spirit of this invention.

Further objects of the present invention and its features will suggest themselves to those skilled in the art upon a reading of the present specification, together with the drawings annexed hereto wherein, throughout the several views, similar reference characters denote similar elements.

BRIEF DESCRIPTION OF THE DRAWINGS

FIG. 1A is an exploded, enlarged perspective view of two of the components of an ear-attachment means of the eyeglass support system of FIG. 1;

FIG. 1B is a plan view of the components of a frame-connecting means of the eyeglass support system of FIG. 1A; and FIG. 2 is a side perspective view of the ear-attachment means of FIGS. 1 and 1A positioned around a wearer's ear.

DETAILED DESCRIPTION OF THE INVENTION

Figure 1:
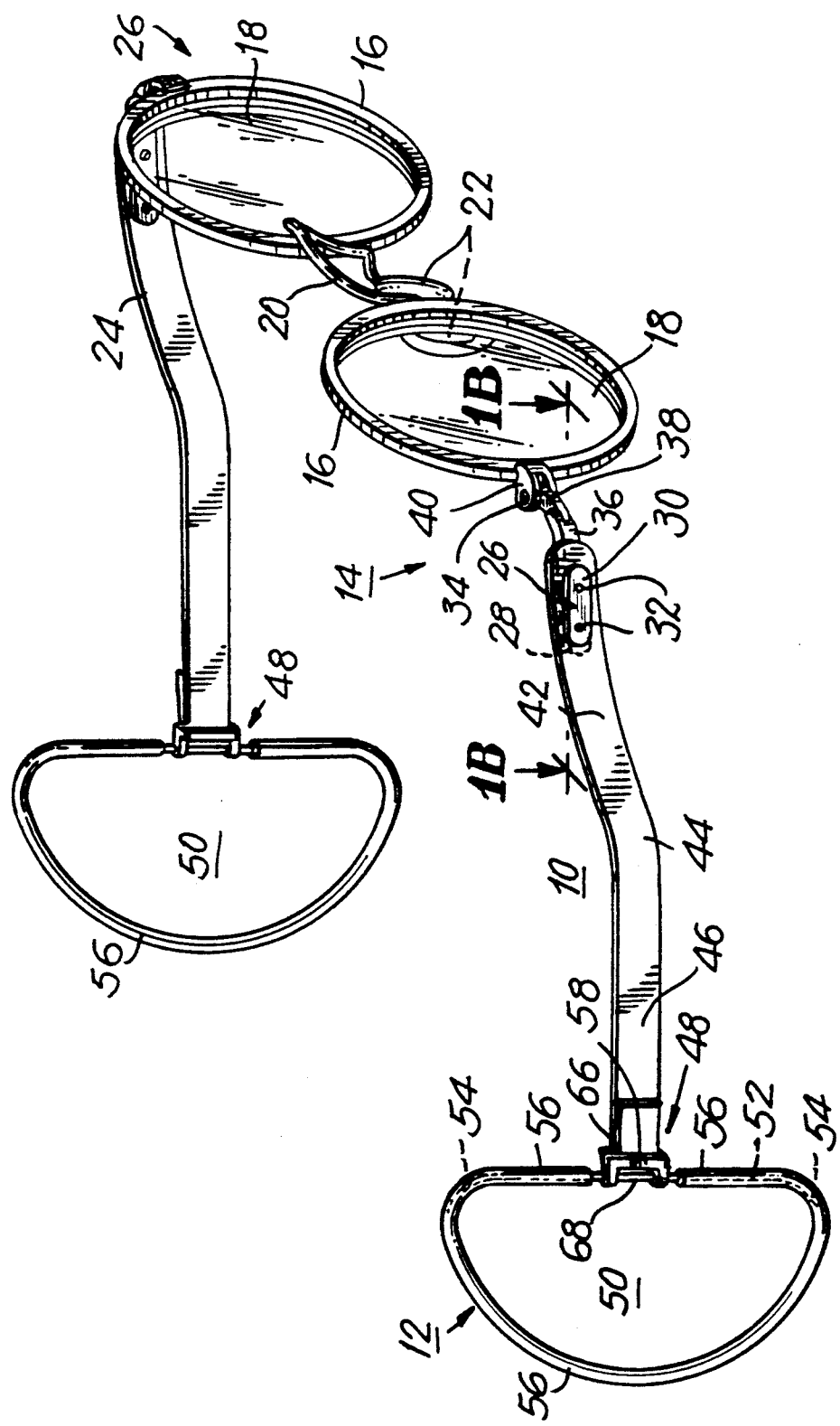
FIG. 1 is a side perspective view of an eyeglass support system according to this invention connected to a pair of eyeglasses, the details of only one side of the support system being shown, because the details of the other side correspond closely, as do the two temples of a conventional eyeglass support system.

Referring now to the drawings, the eyeglass support system shown comprises a temple 10, an ear-attachment means indicated generally at 12 at one end of the temple 10 and a frame-connecting means indicated generally at 14 at the other end of the temple 10. The frame-connecting means 14 is connected to the near side of a frame 16 of a pair of eyeglasses having lenses 18, a nose bridge 20 and nose pads 22. The far side of the frame 16 is connected to a second temple 24 by second frame-connecting means indicated generally at 26 and the temple 24 is in turn connected to a second ear-attachment means (not shown). The temple 24, the frame-connecting means 26 and the ear-attachment means on the far side of the drawing are substantially similar to, and indeed nearly identical to the corresponding structures on the near side of the eyeglasses, what differences there are relate to customary right- and left- handing of parts, as needed to make the frame connection and to dispose some structures on the inside or outside of the support system, referring to the eventual wearer.

The frame-connecting means 14 comprises, as is shown more clearly in FIG. 1B read in conjunction with FIG. 1, comprises a flat hinge plate 28 disposed on an inside end wall of the temple 10 at the forward end thereof, a flat hinge anchor plate 30 lying against the outside end wall of the temple 10, two hinge-plate screws 32 and a threaded hinge pin 34. The hinge plate 28 carries a curved forward extension 36 which terminates in an apertured hinge nub 38 designed to be accommodated within a conventional hinge fork 40 which projects laterally from a vertically considered mid-point of the frame 16. The hinge nub 38 and hinge fork 40 are pivotably joined by threaded hinge pin 34 which mates with threads in the hinge fork 40 so that the temple 10 and ear-attachment means 12 can be folded across the eyeglasses in the same way as conventional hinged temples. The end of the temple 10 is apertured or drilled out to accommodate the hinge plate screws 32. The outer surface of the anchor plate 30 provides an excellent surface to carry a commercial logo or other adornment. The frame-connecting means 14 is preferably formed of metallic materials and highly polished stainless steel is suitable.

The temple 10 has a flattened S-shape profile in side elevation with a downward declination 42 just rearward of the frame-connecting means 14 and a turn 44 to a roughly horizontal span 46 which terminates at an adjustable clasp 48 connecting the temple 10 to the ear-attachment means 12. All directions mentioned herein are from the point of view of an upright wearer looking approximately straight ahead.

The dropaway of the temple 10, which can be enhanced by a downward tilt to the hinge plate 28, serves to carry it away from the wearer's immediate peripheral view, rendering the unique temple of the present invention less obtrusive than the temples of prior art eyeglass support systems. The degree of curvature or general downward declination of the temples 10 and 24 can be varied according to the height of the point of attachment to the frame 16, higher points requiring more curvature to carry the temple 10 downwardly away from the wearer's peripheral view. This variability provides a novel opportunity to customize the fit of a pair of eyeglasses to people of diverse anatomies by offering them a selection of temples or eyeglass support systems having different curvatures the better to position the lenses 18 in front of the wearer's eyes for different conformations and positioning of nose, ears and eyes. Because the rearward ends of the temples 10 and 24 are substantially below the tops of the ears, unlike conventional temples which pass over the ears, it becomes possible for the temples to be disposed somewhat below the level of the eyeball and thus somewhat out of the wearer's field of vision which is thus less obstructed.

In transverse section in a plane perpendicular to the drawing the temple 10 has an elongated shape with a thin side wall that can, if desired be provided with longitudinal ribs.

The temple 10 has a somewhat extended vertical depth to lend some vertical dimensional stability to a transversely flexible material such as a translucent polypropylene of the order of one quarter inch deep and 20 to 50 mil thick. Such a material is soft and pliable and therefore comfortable as it lies against the wearer's head or cheek and is non-elastic. The temple material can be translucent to be less distracting or obtrusive and furthermore, pliant, non-elastic materials such as polypropylene lend themselves to fashionable colorings such as pale shades of fluorescent pink, green or orange. Appealing appearance is important to even quite small children nowadays and is of assistance in helping them through the traumatic experience of learning to wear their first pair of corrective glasses.

The ear-attachment means 12 comprises an adjustable D-ring 50 and the adjustable clasp 48 to secure the temple 10 to the D-ring 50. D-ring 50 comprises a rigid, elongated earpiece 52 in the form of a stainless steel rod 52 designed to extend vertically across the front of the ear and having its ends turned to provide ear-embracing arms 54 designed to engage confortably around the top and bottom of the wearer's ear. The better to fit different sizes of ear, and especially children's ears, the earpiece 52 can be adjustable in length or a selection of lengths can be supplied for an optometrist's use. To complete the D-ring 50 of the ear-attachment means 12 a flexible tube 56 which is a snug, gripping but slidable fit on the earpiece 52 has one end extending over each ear-embracing arm 54 on to the earpiece 52 and provides a loop between them, the loop forming the curve or "C" of the D-shape. The tube 56 is preferably formed of a soft, pliable material such as polypropylene so that it is comfortable. The ends of the tube 56 can be moved up and down by the wearer on the earpiece 52 to change the size of the loop it forms and adjust the size of the D-ring 50 to fit comfortably and securely around the wearer's ear. Ear-embracing arms 54 serve the dual purpose of helping locate and hold the ear-attachment means 12 on a wearer's ear and of also holding the flexible tube 56 in the chosen adjusted position on the earpiece 52 so that it does not lose its positioning with normal wear and requires significant effort to adjust it.

As best shown in FIG. 1A, the clasp 48 which adjustably connects the temple 10 to the earpiece 52 comprises a doubled-over metal stamping 58 formed from a rectangular frame or border of material which is shaped to provide two hinge lobes 60, temple clamps 62 and two holding pin sockets 64. The clasp 48 additionally comprises a holding pin 68 around which is wrapped an end 66 of the temple 10, positioned according to the desired length of the temple 10. The stamping 58, in an open configuration is slipped over the earpiece 52 engaging the earpiece 52 in the hinge lobes 60, then the holding pin 68 with the wrapped temple end 66 is located in pin sockets 64 and the temple clamps 62 are securely clamped together using a crimping tool. The temple end 66 is thus substantially squeezed and securely locked around the holding pin 68. Depending upon the exact details of construction, the temple end 66 may be locked more or less permanently, but it is preferred that the design is such that to unlock the end is beyond the skill of the average user who will thereby be deterred from meddling with the optometrist's adjustments.

The nature of engagement of the hinge lobes 60 on the ear-piece 52 is also subject to the exact details of design and it will be well within the ability of a skilled technician to determine whether the clasp 48 is slidably or fixedly attached to the earpiece 52. For most purposes it is preferred that the attachment permits both sliding and pivoting movement of the clasp 48 on the earpiece 52, albeit with some resistance so that they are not loose, so that the ear-attachment means 12 has a self-adjusting character and readily adopts a comfortable position. However, special requirements might prefer exact positioning to be rendered permanent by crimping or providing stops on the earpiece 52, or by other mechanical means, thereby preventing sliding or rotational movement or both of the clasp 48 and attached temple 10 about the earpiece 52.

A wearer first positions one of the D-rings 50 over one ear for example by lowering the D-ring 50 over the top of the ear 70 and then tucking the ear lobe 72 out through the bottom of the D-ring 50 so that it adopts a position substantially as shown in FIG. 2.

In the position of FIG. 2 the upper ear-embracing arm 54 extends into the cleft 74 between the upper ear 70 and the wearer's head and the lower ear-embracing arm 54 extends into the cleft 76 between the ear lobe 72 and the wearer's head or upper neck.

Being flexible and adjusted to size, the D-ring 50 can adapt to follow the contour of the back of the ear so as to have least freedom of movement and best distribute any pressure about the ear without discomfort or chafing. The eyeglasses can be allowed to hang from one ear whilst the wearer changes their grip, and the D-shape of ring 50 helps dispose the eyeglass assembly forwardly so that, with one hand or two, it can be raised into position on the bridge of the nose. The second D-ring 50 is then fitted about the other ear in a similar manner to the first. If the D-ring 50 is uncomfortable or will not fit, the wearer removes it, adjusts the flexible tube 56 and tries again.

An important feature of the invention is that any pressure or loading is distributed around the ear rather than being concentrated in a single spot on top of or behind the ear where concentrations of nerve endings can create substantial discomfort and where conventional eyeglass support systems can all too often create sores or lesions. Indeed, eyeglasses can be quite light in weight and there is no inherent reason for them to create enough pressure to cause discomfort or ailments. These disorders often arise from stresses generated in attempts to hold the eyeglasses in place for example by elastication or by stressing the temples between the bridge of the nose and the back of the ear in an effort to hold the eyeglasses in place, generating uncomfortable and potentially damaging reaction pressures on the tissues in both locations.

In contrast, the D-ring 50 arrangement of the ear-attachment means 12, by virtue of the comfortable anchoring provided by cooperation of the upright earpiece 52 and the ear-embracing arms 54, holds the temples 10 and 24 with little freedom of movement and substantially no imposed stresses, so that the eyeglasses may rest lightly on the bridge of the nose yet are properly located by the temples 10 and 24 to be held in an optically correct position and are also comfortably restrained from sliding down the nose, or other dislodgement.

Should the eyeglasses become dislodged, for example by a child performing a handstand, they can reasonably be expected to fall back into position, or close to it, and to this end it should be noted that with the construction shown the clasp 48 holds the temple 10 against upward rotation about a horizontal axis about the earpiece 52.

Regardless of the activity, whether it be the rough and tumble of children playing, the athletic movement of tennis, cycling or simply bending down to pick up a golf ball, or the wind and jolts of boating, however wet or bathed in perspiration the user's face, there is little likelihood of glasses attached to the support system of this invention becoming dislodged. Moreover, they can be worn comfortably for long periods and leave the wearer's hair free, being strapless and free of any headband.

With regard to the particular demands of supplying corrective glasses for children, the invention provides both broadly and in its preferred embodiments a uniquely cooperative system that well satisfies their rather important list of needs. The several adjustments and selections allow for a particularly precise fit, which once achieved can be maintained through vigorous activity, and the eyeglass support system is comfortable, lacking significant pressure points, and easier to become accustomed to, when provided with unobtrusive "drop-away" temples.

Clearly the particular natures of the lenses 18 and the frame 16 are not material to the purposes of the present invention. Although certain special merits are obtained for refractive, corrective lenses, the lenses can equally well be non-refractive and comprise sunglasses or protective glasses, or be clear.

Although the construction shown has many advantages, as described, it will be apparent to those skilled in the art that the temple 10 could, for example be a thin, substantially straight, rigid member, that it could join the earpiece 52 at the top thereof and that it could be formed integrally therewith. Although a soft, comfortable material is desirable for the flexible tube 56, it could be replaced by a more or less rigid member that could be resilient and might even snap open, and closed, to fit around the ear without the need to fold or tuck the ear.

It is furthermore not essential for the configuration of the temple 10 and the earpiece 52 where they are joined by the clasp 48 to be T-shaped, more of a Y configuration could achieve the advantages of this invention so long as the ear-embracing arms 54 can anchor comfortably above and below the ear. In this way, the temple 10, the earpiece 52 and the ear-embracing arms could be made in a single generally Y-shaped molding. A better construction is obtained if the ear-embracing arms 54 are held more or less rigidly in appropriate spaced apart relationship, but as an alternative, they could be resiliently urged into gentle engagement with the ear.

The embodiments of the invention disclosed and described in the present specification and drawings and claims are presented merely as examples of the invention. Other embodiments, forms and modifications thereof will suggest themselves from a reading thereof and are contemplated as coming within the scope of the present invention.

What is claimed is:

1. An eyeglass support system for eyeglasses which include a frame having an eye wire extending around and holding a pair of lenses, one for each eye and having a bridge between the lenses to rest on the wearer's nose and support the lenses in front of their eyes which eyeglass support system comprises a pair of temples to extend from the frame at opposed sides thereof to lie across each ear, frame-connecting means to connect each temple at one end thereof to one of the sides of the frame, and ear-attachment means for each temple which includes an elongated earpiece connected to its temple so as to be substantially upright when the wearer's head is also upright and said ear-attachment means further comprises a flexible tube fitting over both ends of said elongated earpiece so as to form a substantially D-shaped ring, said flexible tube being slidingly fittable over said elongated earpiece so as to adjust the size of said D-shaped ring.

2. An eyeglass support system according to claim 1 wherein the ear piece is a rigid rod and the ends are each turned to fit around the ear and the flexible tube extends on to the rod past the turned ends to be held securely but slidably thereon.

3. An eyeglass support system according to claim 1 wherein the flexible tube is formed of a soft, pliable comfortable material.

4. An eyeglass support system according to claim 1 having temple-to-earpiece connection means which is adjustable to vary the length of the temple and the temple is laterally flexible.

5. An eyeglass support system according to claim 1 wherein each temple can be shaped to extend generally downwardly from its connection point at a side of the frame carrying it somewhat out of sight of the wearer.

6. An eyeglass support system according to claim 5 wherein each temple is generally S-shaped in side elevation and is translucent.

7. An eyeglass support system according to claim 1 wherein the frame-connecting means at the end of each temple comprises an apertured hinge nub formed to connect with a standard hinge fork provided on each side of the frame of eyeglasses constructed to have hinged temples by means of a threaded hinge pin.

8. An eyeglass support system according to claim 1 wherein the frame-connecting means comprises a releasable clip adapted to pass through the apertures in a threaded hinge fork at the side of said frame and lock on to the fork whereby the temples can readily be connected to and disconnected from a hinged eyeglass frame.

9. An eyeglass support system according to claim 1 wherein each temple comprises a single member connected to the elongated earpiece intermediately of said ear-embracing arms.

10. The eyeglass support system of claim 1 further comprising a pair of upper and lower ear embracing arms integral with respective ends of said elongated earpiece and over which said flexible tube slidingly fits.

11. An eyeglass support system for eyeglasses which include a frame having an eye wire extending around and holding a pair of lenses, one for each eye and having a bridge between the lenses to rest on the wearer's nose and support the lenses in front of their eyes which eyeglass support system comprises a pair of temples to extend from the frame at opposed sides thereof to lie across each ear, frame-connecting means to connect each temple at one end thereof to one of the sides of the frame, and ear-attachment means for each temple which includes an elongated earpiece connected to its temple so as to be substantially upright when the wearer's head is also upright and a pair of upper and lower ear-embracing arms extending respectively over and around the upper ear in the cleft between the upper ear and the head and under and around the lower ear or ear lobe in the cleft between the lower ear and the head or upper neck said ear-attachment means being capable of holding each temple attached to its respective ear and thereby of holding the eyeglasses in position, wherein the point of attachment of the rearward end of the temple is vertically adjustable for more accurately positioning the lenses on different anatomies.

12. An eyeglass support system according to claim 1 further comprising said frame having said eye wire extending around and holding said pair of lenses, one for each eye and having a bridge between the lenses to rest on the wearer's nose and support the lenses in front of their eyes.

13. An eyeglass support system for eyeglasses which include a frame having an eye wire extending around and holding a pair of lenses, one for each eye and having a bridge between the lenses to rest on the wearer's nose and support the lenses in front of their eyes which eyeglass support system comprises a pair of generally S-shaped, laterally flexible temples to extend downwardly from the frame at opposed sides thereof to lie across each ear, frame-connecting means to connect each temple at one end thereof to one of the sides of the frame, and ear-attachment means for each temple which includes an elongated earpiece connected to its temple so as to be substantially upright when the wearer's head is also upright and a pair of upper and lower ear-embracing arms at the ends of said earpiece which arms extend respectively over and around the upper ear in the cleft between the upper ear and the head and under and around the lower ear or ear lobe in the cleft between the lower ear and the head or upper neck and a flexible tube which is a close slidable fit on said ear-embracing arms and extends therebetween in a loop to provide a generally D-shaped ring capable of fitting comfortably around a wearer's ear.

14. An eyeglass support system according to claim 13 further comprising said frame having said eye wire extending around and holding said pair of lenses, one for each eye and having a bridge between the lenses to rest on the wearer's nose and support the lenses in front of their eyes.

* * * * *